UNITED STATES PATENT OFFICE.

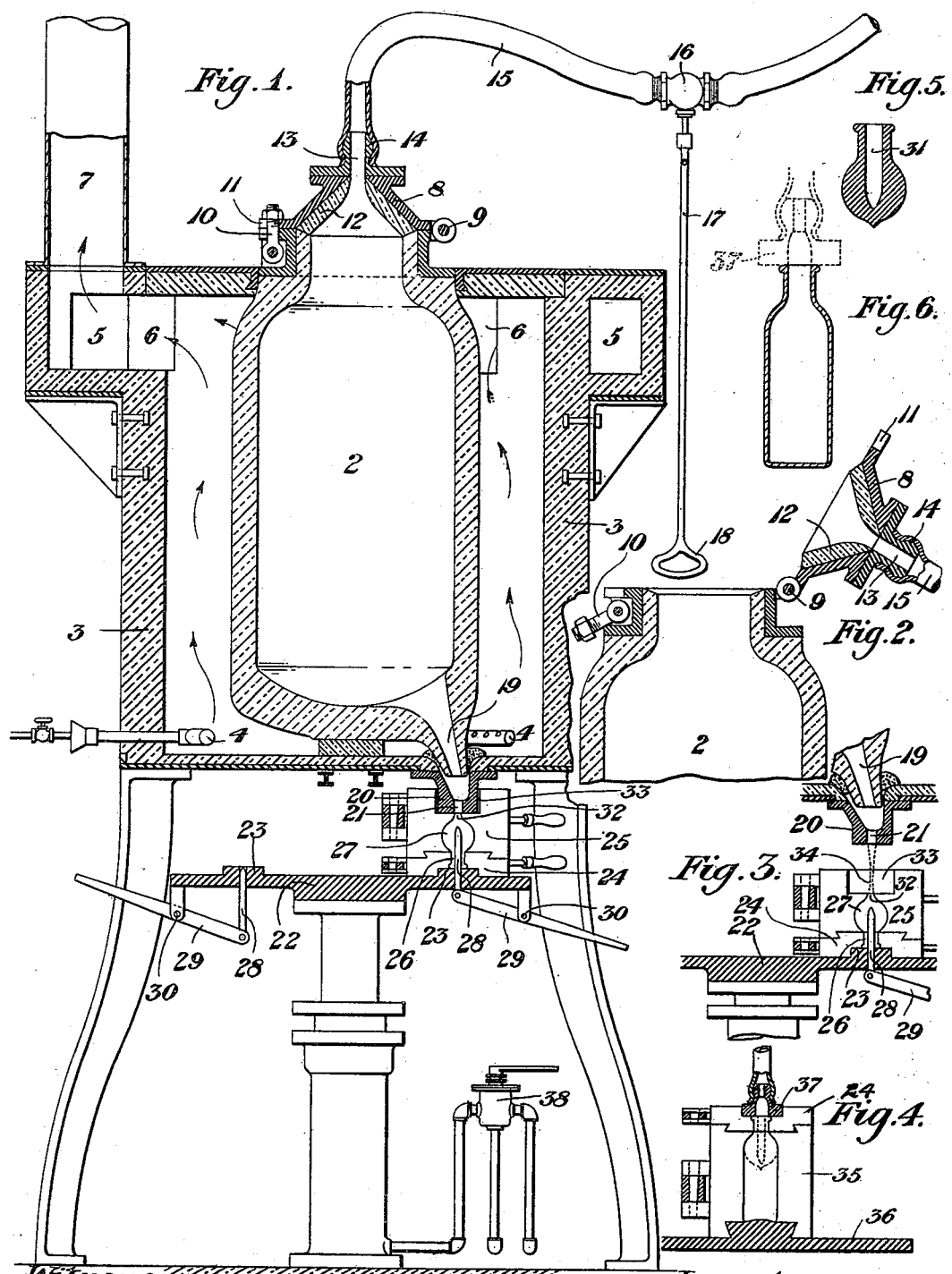

ALEXANDER HUMPHREY, OF PITTSBURG, PENNSYLVANIA.

APPARATUS FOR MANUFACTURING GLASSWARE.

SPECIFICATION forming part of Letters Patent No. 666,422, dated January 22, 1901.

Application filed June 30, 1898. Renewed February 8, 1900. Serial No. 4,559. (No model.)

*To all whom it may concern:*

Be it known that I, ALEXANDER HUMPHREY, a citizen of the United States, residing at Pittsburg, in the county of Allegheny and State of Pennsylvania, have invented or discovered a new and useful Improvement in Apparatus for the Manufacture of Glassware, of which the following is a full, clear, and exact description, reference being had to the accompanying drawings, forming part of this specification, in which—

Figure 1 is a vertical section through a glass-pot and its surrounding furnace with the mold and various other elements involved in the operation of my invention. Fig. 2 is a sectional view of the upper portion of the glass-pot with the top raised for charging. Fig. 3 is a fragmentary sectional detail view illustrating the operation of filling the measuring-mold. Fig. 4 is a sectional view through the measuring-mold and the finishing-mold, showing the blowing-pipe applied. Fig. 5 is a detail view in section of the lump of glass as it comes from the measuring-mold. Fig. 6 is a detail view in section of the finished article, the application of the end of the blowing-pipe being indicated in dotted lines.

My invention relates to the manufacture of glassware and apparatus therefor; and it consists of means whereby a body of molten glass is kept at a melting-heat, means for exerting a pressure upon the mass of molten glass, and means for charging the glass into a mold and for finishing the operation of molding the glass into form.

In the manufacture of pressed glassware considerable skill is required in order to drop the proper amount of glass into the mold, depending on the judgment of the gatherer and operator in cutting off the ball.

One of the objects of the present invention is to render it possible to charge into the mold the same given amount of glass and no more at each operation and to accomplish such charging operation without the use of a gathering-rod by taping from the glass-pot directly into the mold, thereby preventing the chilling of the glass.

Referring now to the drawings, 2 represents a glass-pot of a diameter and depth suitable to contain a mass of melted glass sufficient for one or more turns. The pot is surrounded by the inclosing walls 3 of a furnace-chamber, within which any suitable fuel may be burned, as natural or other gas from burners 4, or solid fuel, if preferred. Surrounding the upper portion of the furnace is a flue 5, into which, by ports 6, the products of combustion escape and finally emerge through the stack 7.

The upper portion of the glass-pot is provided with a top 8, hinged at 9, and a swiveled bolt 10 engages a slot 11, by which means the top 8 may be tightly clamped upon the top of the pot, the meeting faces being ground, so as to make an air-tight fit. The top 8 is provided with a refractory lining 12 and terminates at the top in a reduced opening 13, leading up through a nipple 14, to which is attached the end of a flexible hose 15, leading from any source of air-pressure—as, for instance, a pump. Inserted in the pipe 15 is a valve 16, to the stem of which is attached the end of a rod 17, extending downwardly to within easy reach of the operator with a handle 18. The pot is supported on the floor of the furnace and raised sufficiently high to leave considerable space underneath for the circulation of the gases of combustion, while at one side the pot is provided with a downwardly-extending delivery-nozzle 19, projecting through an opening in the floor of the furnace into a runner-box 20, having a reduced opening 21 through its bottom. In order to seal the opening around the nozzle 19, fire-clay may be used, thus making the joint gas-tight.

Underneath the floor of the furnace is located a revoluble mold-table 22, which is mounted on the ram of a hydraulic cylinder or in any other suitable way to permit of vertical movement of the table in the operation of filling the molds. Upon the table at one or more positions equally distant from its center are upwardly-projecting guiding-bases 23, upon which are set the molds employed in forming the ball of glass preliminary to making the finished article. These consist of an under two-part neck or sustaining mold 24 and an upper two-part measuring-mold 25, adapted to be set upon the neck-mold and to coöperate with it. The neck-mold is provided with a cavity 26 of a size and shape to correspond to the finished neck of the article—in the present case a bottle—and the upper or measuring mold 25 is provided with a cavity 27 of a size and shape to contain a sufficient amount of glass to form the finished article when expanded by air-pressure in the finishing-mold less the cubical contents of the plunger 28. This plunger is mounted on any suitable operating device, as a lever 29, pivoted to a support 30 on the table, and is adapted to be extended up into the cavities of the molds and to form a preliminary air-cavity 31. (See Fig. 5.)

The measuring-mold is provided with a reduced charging-opening 32 of a diameter slightly less than the opening 21 of the runner-box in order to insure proper registering therewith, as in such case a slight lateral movement of the mold will not throw the openings out of alinement, although by proper centering of the molds upon the table and by suitable guiding devices the molds may easily and accurately be brought into perfect alinement with the runner-box, which, as will be seen, projects downwardly into a recess 33 in mold 25 when the mold is raised to charging position. When the molds are thus assembled and the table is raised to the position shown in Fig. 1, the apparatus is in position for charging. I accomplish this by admitting pressure of air in sufficient amount through the pipe 15 upon the surface of molten glass in the pot 2 by opening the valve 16, when the glass will be forced into the molds, completely filling them, the plunger 28 occupying the central position, as shown. The air is then shut off by the valve, the table is lowered, as shown in Fig. 3, and the thin stem of glass 34 is cut off close to the opening 32. The measuring-mold is then opened, and the neck-mold is removed from the table and reversed, carrying with it the ball of glass in suspension, and the mold is set on the top of the finishing-mold 35 on another table 36. Mold 35 is then closed, and the terminal 37 of a blowing-tube is applied to the inverted bottom, now the top, of mold 24, and by pressure of air in the usual manner the article is pressed out into the interior of the finishing-mold, as shown in Fig. 6, after which it may be removed.

I have shown the table 22 as mounted upon a hydraulic ram, the valve 38 of which is placed within easy reach of the operator, and while this means is well adapted to the operation described it will be understood that other means, such as levers, may be substituted therefor and that I do not desire to be limited to the exact construction shown.

The glass-pot 2 is charged with molten glass through the door 8, which is then clamped down tight, and by means of the combustion of fuel within the inclosing furnace-walls 3 the heat and consistency of the glass may be kept at any desired temperature and condition. By properly regulating these qualities and by adjusting the size of the outlet-openings I am enabled to regulate and control the flow of glass into the molds in such a manner as to prevent undue leakage between the molds, while at all times having the glass under control of the operator through valve 16.

The operation is as follows: A charge of molten glass having been prepared in the pot 2 and the sustaining-mold 24 and measuring-mold 25 having been placed in position and brought up in position under the runner-box, with the plunger 28 raised, the valve 16 is opened, admitting air-pressure upon the glass, which is then forced down through the opening 21 into the molds, filling them, when the valve 16 is closed. The mold-table 22 is then lowered and the stem of glass is cut off, when the measuring-mold is opened and removed, the plunger having been withdrawn. The sustaining-mold is then reversed with the suspended ball and placed over the finishing-mold, as in Fig. 4, when by air-pressure the ball is blown into the finishing-mold, thus completing the operation.

The advantages of my invention will be appreciated by those skilled in the art, as by its use the operation of transferring the proper amount of glass from the pot to the mold is rendered much more simple, accurate, and economical, and the improvement in the art of manufacturing pressed or blown glassware marks a decided step in the art.

Having described my invention, what I claim, and desire to secure by Letters Patent, is—

1. In combination with a glass-pot provided with means for exerting air-pressure therein, and an intervening runner-box provided with a discharge-opening: a measuring-mold and sustaining-mold and a vertically-adjustable table, substantially as set forth.

2. In combination with a glass-pot provided with means for exerting air-pressure therein, and an intervening runner-box provided with a discharge-opening: a measuring-mold and sustaining-mold, a vertically-adjustable table and a plunger mounted therein adapted to be inserted in the mold-cavities, substantially as set forth.

3. In combination with a glass-pot provided with means for exerting air-pressure therein and an intervening runner-box provided with a discharge-opening, a sustaining-mold mounted on a vertically-adjustable table and a measuring-mold on the sustaining-mold with a reduced charging-opening adapted to be brought into register with the discharge-opening of the runner-box, substantially as set forth.

4. In combination with a glass-pot provided with means for exerting air-pressure therein, and an intervening runner-box provided with a discharge-opening: a measuring-mold provided with a reduced charging-opening, a sustaining-mold, a vertically-adjustable table and a plunger adapted to be inserted in the mold-cavities, substantially as set forth.

5. The combination of a measuring-mold and sustaining-mold, means for raising and lowering the molds, means for charging glass into the molds, an air-cavity plunger adapted to be inserted in the mold-cavities and to be withdrawn therefrom, and a finishing-mold upon which the sustaining-mold is adapted to be set and in which the article is finished by further blowing, substantially as set forth.

6. The combination of a glass-pot mounted within an inclosing furnace structure, a delivery-spout of the pot projecting downwardly through the floor of the furnace, a charging-door for the pot adapted to be clamped thereon with an air-tight joint, an air-pressure pipe connected with the charging-door and provided with a controlling-valve, and a mold adapted to be adjusted to the delivery-spout, substantially as set forth.

In testimony whereof I have hereunto set my hand.

ALEXANDER HUMPHREY.

Witnesses:
   PETER J. EDWARDS,
   C. M. CLARKE.